US012610026B2

(12) United States Patent
Williams

(10) Patent No.: US 12,610,026 B2
(45) Date of Patent: Apr. 21, 2026

(54) VEHICLE OCCUPANT SECURITY SYSTEMS AND METHODS

(71) Applicant: Terrance J. Williams, Chicago, IL (US)

(72) Inventor: Terrance J. Williams, Chicago, IL (US)

( * ) Notice: Subject to any disclaimer, the term of this patent is extended or adjusted under 35 U.S.C. 154(b) by 0 days.

(21) Appl. No.: 17/971,823

(22) Filed: Oct. 24, 2022

(65) Prior Publication Data

US 2024/0137470 A1 Apr. 25, 2024
US 2024/0236273 A9 Jul. 11, 2024

(51) Int. Cl.
| | |
|---|---|
| *H04N 7/18* | (2006.01) |
| *B60Q 1/26* | (2006.01) |
| *B60Q 1/50* | (2006.01) |
| *B60R 1/12* | (2006.01) |
| *B60R 1/26* | (2022.01) |
| *B60R 1/29* | (2022.01) |
| *H04N 9/31* | (2006.01) |

(52) U.S. Cl.
CPC .......... *H04N 7/181* (2013.01); *B60Q 1/2665* (2013.01); *B60Q 1/503* (2013.01); *B60R 1/12* (2013.01); *B60R 1/26* (2022.01); *B60R 1/29* (2022.01); *H04N 9/3141* (2013.01); *B60Q 2400/50* (2013.01); *B60R 2001/1215* (2013.01); *B60R 2001/1253* (2013.01)

(58) Field of Classification Search
CPC .... H04N 7/181; H04N 9/3141; B60Q 1/2665; B60Q 1/503; B60Q 2400/50; B60R 1/12; B60R 1/26; B60R 1/29; B60R 2001/1215; B60R 2001/1253
See application file for complete search history.

(56) References Cited

U.S. PATENT DOCUMENTS

| | | | | |
|---|---|---|---|---|
| 5,497,306 A | * | 3/1996 | Pastrick | ............... B60Q 1/38 |
| | | | | 362/652 |
| 2006/0012990 A1 | * | 1/2006 | Walser | ............... G02B 6/4298 |
| | | | | 362/494 |
| 2008/0055287 A1 | * | 3/2008 | Ishikawa | ............. H04N 9/3185 |
| | | | | 345/204 |
| 2010/0253919 A1 | * | 10/2010 | Douglas | ............... G03B 21/14 |
| | | | | 353/121 |
| 2014/0049405 A1 | * | 2/2014 | Breuer | ............... G01N 21/35 |
| | | | | 340/905 |
| 2016/0148062 A1 | * | 5/2016 | Fürsich | ............... G06V 20/56 |
| | | | | 348/36 |
| 2017/0013188 A1 | * | 1/2017 | Kothari | ............... G06F 3/017 |
| 2017/0017305 A1 | * | 1/2017 | Hur | .................... H04N 13/271 |
| 2018/0181359 A1 | * | 6/2018 | Monroe | ............... B60K 35/60 |
| 2021/0268959 A1 | * | 9/2021 | Hu | .......................... B05B 12/12 |
| 2022/0410709 A1 | * | 12/2022 | Florentz | .............. B60K 37/10 |

FOREIGN PATENT DOCUMENTS

CN 114613022 A * 6/2022 ............ G10L 15/26

* cited by examiner

*Primary Examiner* — Sath V Perungavoor
*Assistant Examiner* — Tyler B Edwards
(74) *Attorney, Agent, or Firm* — Chiacchio IP, LLC; Theodore J. Chiacchio

(57) ABSTRACT

Disclosed herein are systems for enhancing physical security of a vehicle occupant comprising a holographic projector component; a data repository component; a sensor component; a digital camera component; and a display screen component communicatively connected with the digital camera component. Also disclosed herein are associated methods for enhancing physical security of a vehicle occupant.

19 Claims, 6 Drawing Sheets

400

401

402

403

403

VEHICLE OCCUPANT SECURITY SYSTEMS AND METHODS

FIELD OF THE INVENTION

The present disclosure relates to systems and methods for enhancing security of vehicle occupants. More particularly, the present disclosure relates to achieving such enhanced security utilizing holographic technology.

BACKGROUND

Much violent crime occurs where a victim is located inside of a vehicle. Rates at which "carjackings" are taking place have increased substantially over the past two years in particular.

Publicly available literature discusses a number of techniques to help mitigate risk of becoming a victim of violent crime when located inside of a vehicle. Such techniques include, among others, inspecting the area around a vehicle before exiting the vehicle, staying alert at red lights to facilitate detection of potential perpetrators of crime, and keeping doors locked and windows closed. However, existing techniques for mitigating risk of violent crime against an occupant of a vehicle are directed generally to increasing speed with which a potential perpetrator is detected and preventing access to a vehicle's interior if a perpetrator approaches the vehicle. Even when such preventative measures are undertaken, however, carjackings and other violent crime directed against vehicle occupants persist.

Recently, there have been a number of incidents that have gained national publicity involving physical altercations between vehicle occupants and law enforcement officers after a law enforcement officer stopped a vehicle for a traffic violation or other suspected unlawful activity. Such incidents may decrease in frequency and/or magnitude if law enforcement officers and vehicle occupant(s) feel a greater sense of physical security.

What is needed, therefore, are systems for enhancing a vehicle occupant's physical security. What is needed are systems for enhancing a vehicle occupant's ability to detect persons approaching the vehicle that they occupy. What is needed are systems that enhance ability to maintain physical barriers between the interior and exterior of a vehicle so that vehicle occupants on the one hand, and law enforcement officers and/or others approaching a vehicle for a lawful purpose on the other hand, feel a greater sense of physical security during traffic stops and other interactions. What is needed are methods for enhancing a sense of physical security on the part of vehicle occupants and law enforcement officers during a traffic stop in order to decrease frequency and magnitude of physical altercations between such vehicle occupants and law enforcement officers. What is needed are methods for mitigating risk of falling victim to violent crime when inside a vehicle.

SUMMARY

Disclosed herein are systems, installable in a vehicle, for enhancing physical security of a vehicle occupant. Systems of the present disclosure may comprise a holographic projector component; a data repository component communicatively and operatively connected with the holographic projector component; a sensor component; a data analyzing component communicatively and operatively connected with the sensor component; a control component communicatively and operatively connected with the data analyzing component; a digital camera component communicatively and operatively connected with the control component; and a display screen component communicatively and operatively connected with the digital camera component.

DETAILED DESCRIPTION

Figure 1:
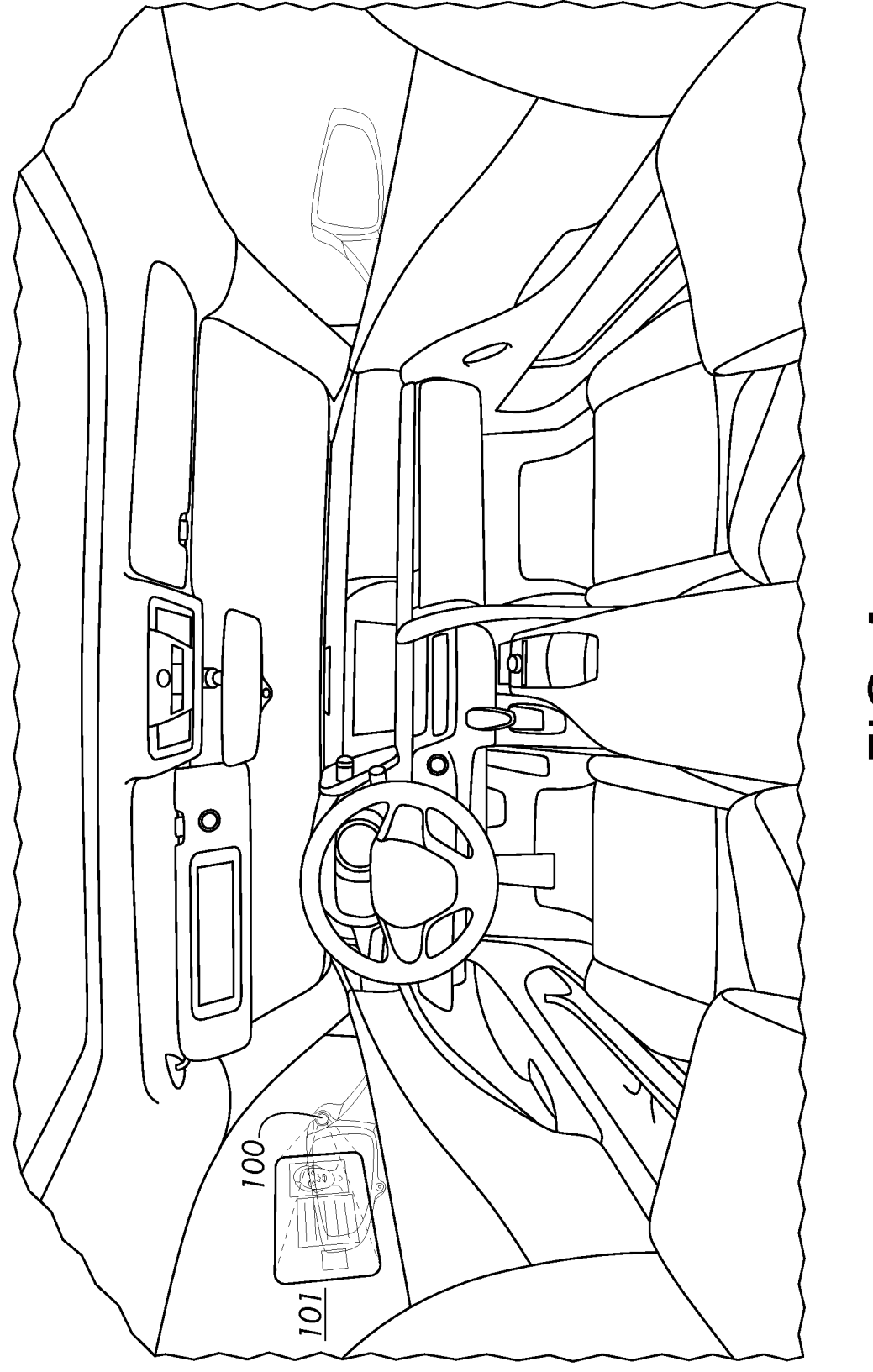
FIG. 1 is a perspective view of an interior of a vehicle comprising a holographic projector component according to the present disclosure wherein the holographic projector component has been activated.
Figure 2:
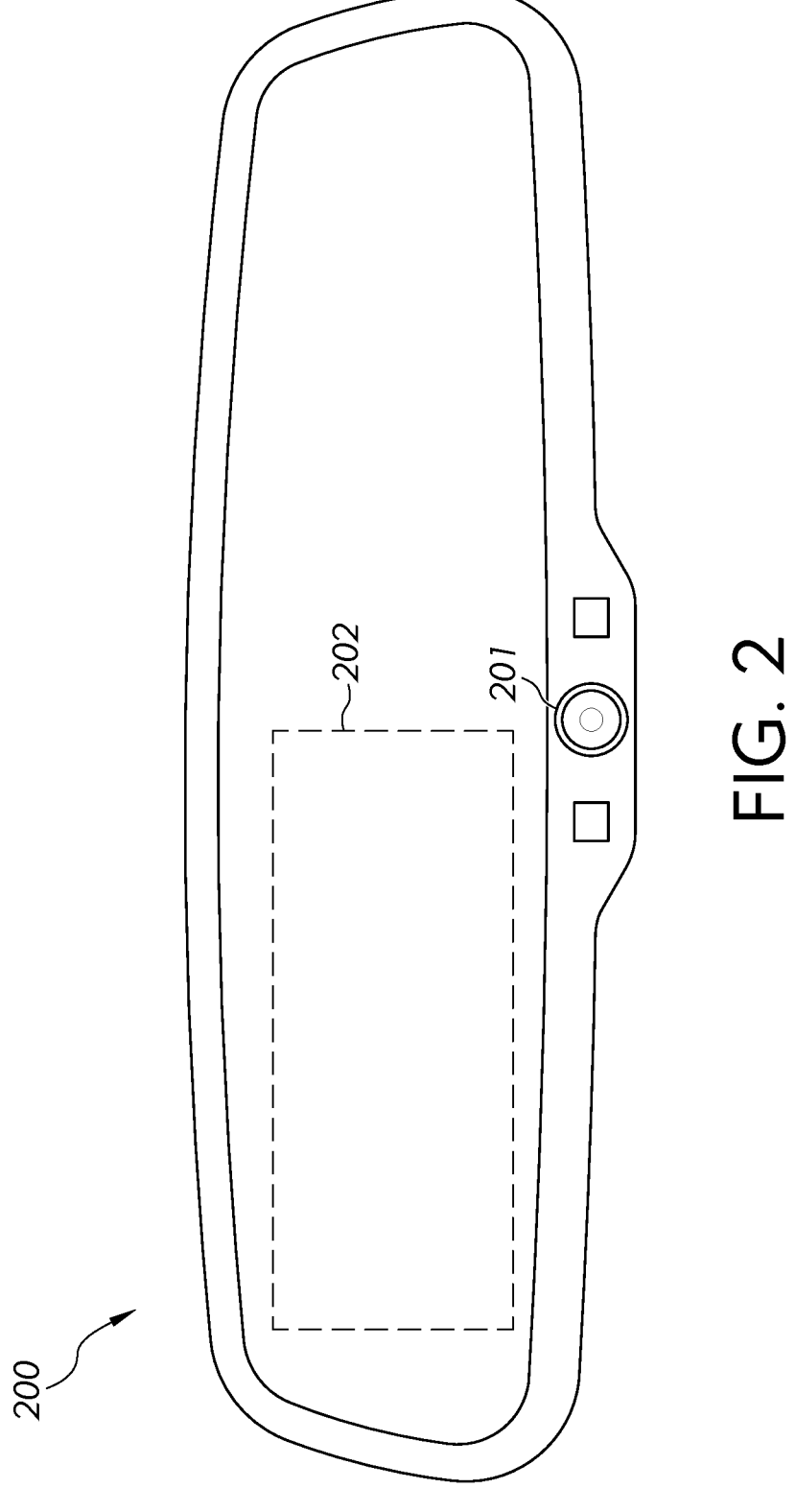
FIG. 2 is a front view of a digitally-enhanced rear view mirror component according to the present disclosure.
Figure 3:
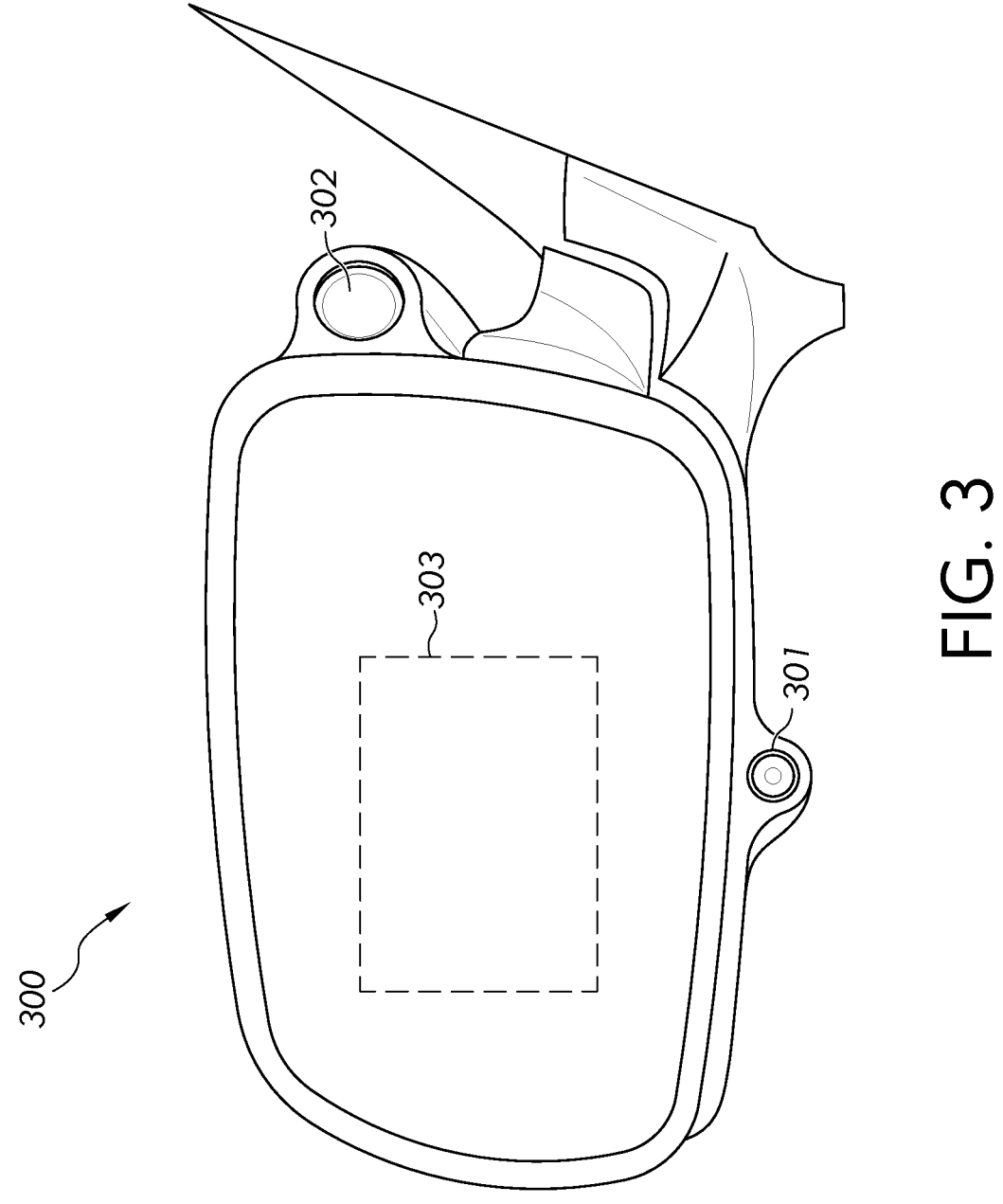
FIG. 3 is a front view of a digitally-enhanced side view mirror component according to the present disclosure.
Figure 4:
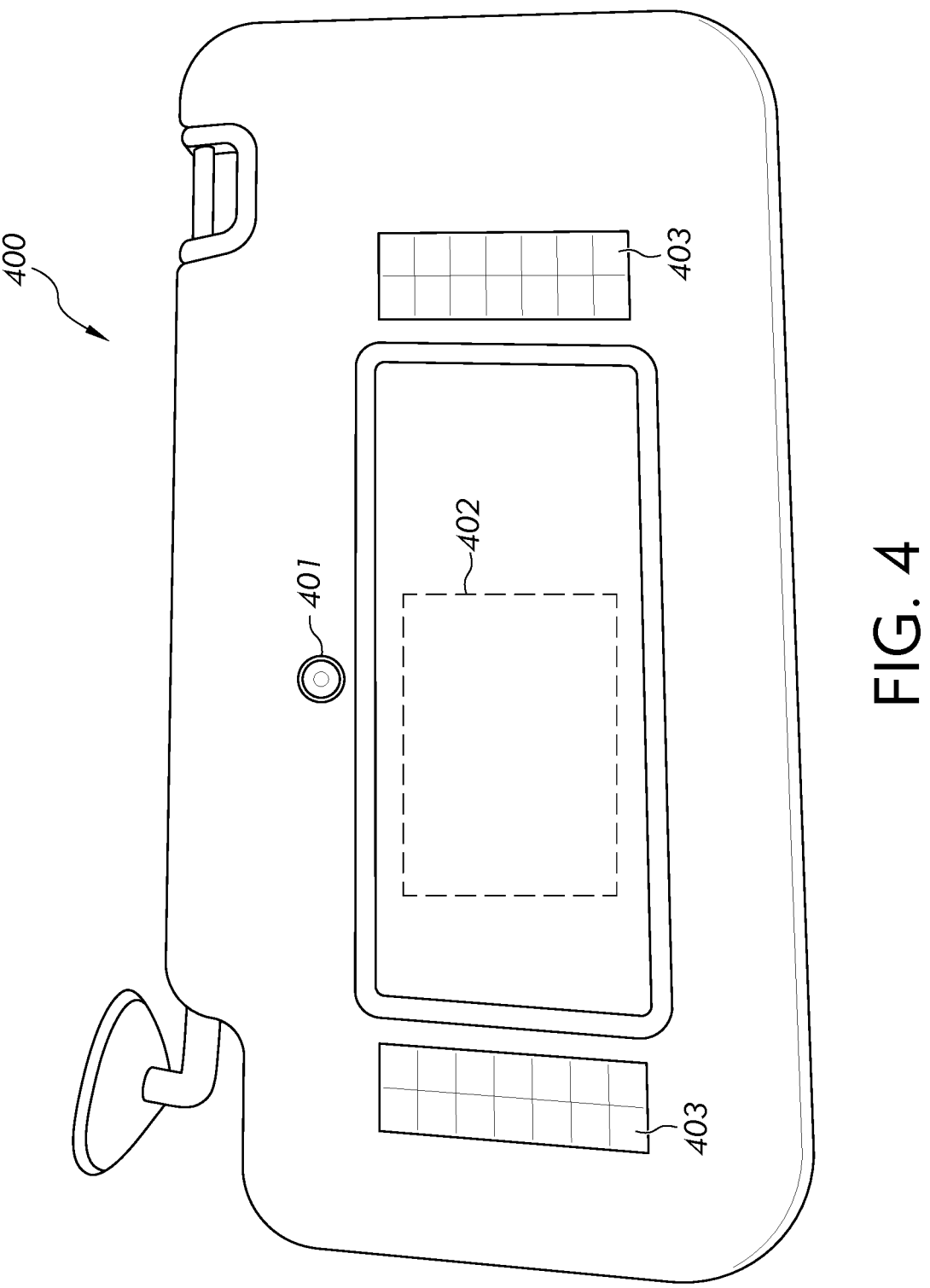
FIG. 4 is a front view of a digitally-enhanced sun visor component according to the present disclosure.
Figure 5A:
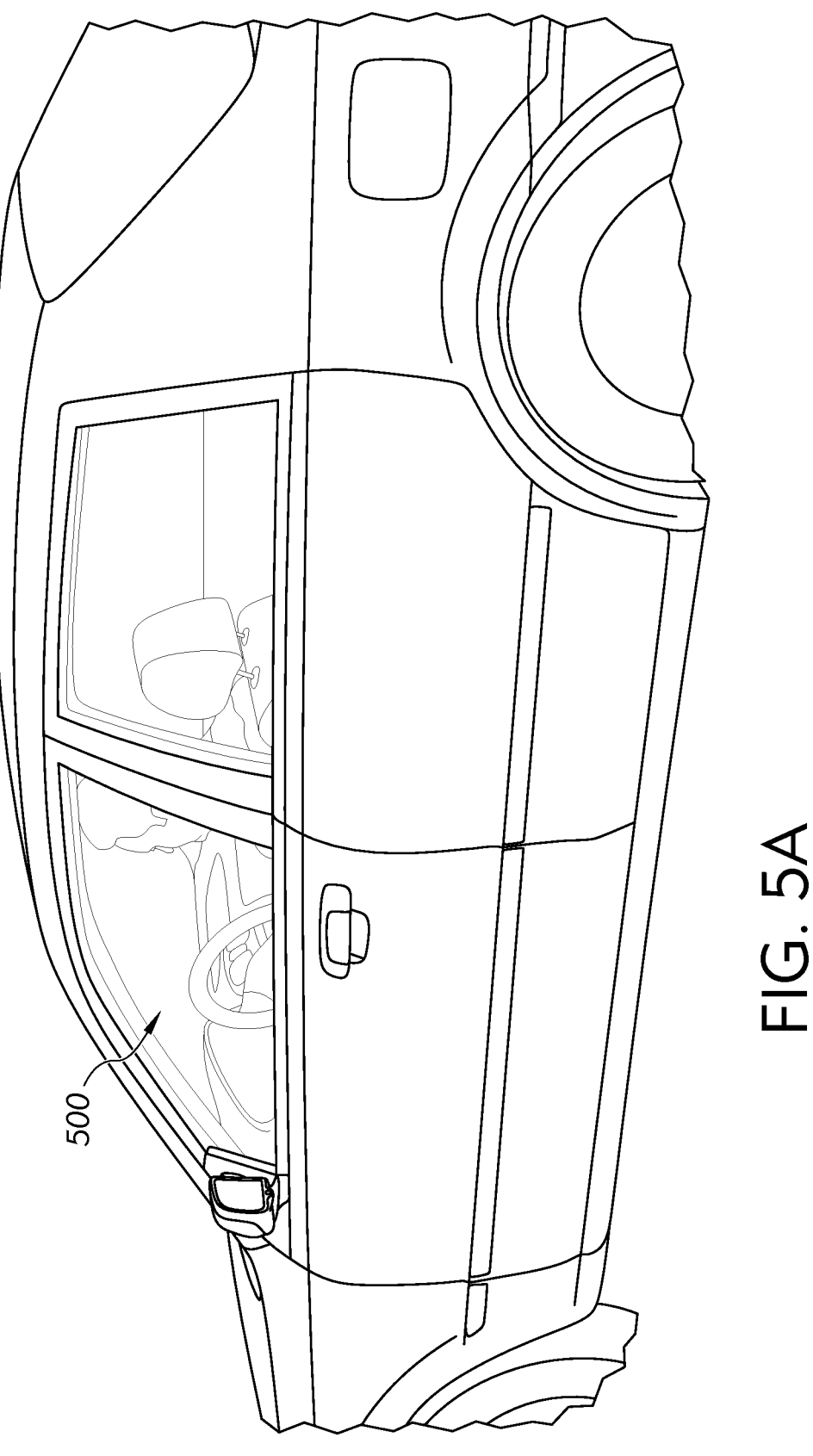
FIG. 5A is a left-side view of a vehicle with an individual occupying a driver's seat of the vehicle.
Figure 5B:
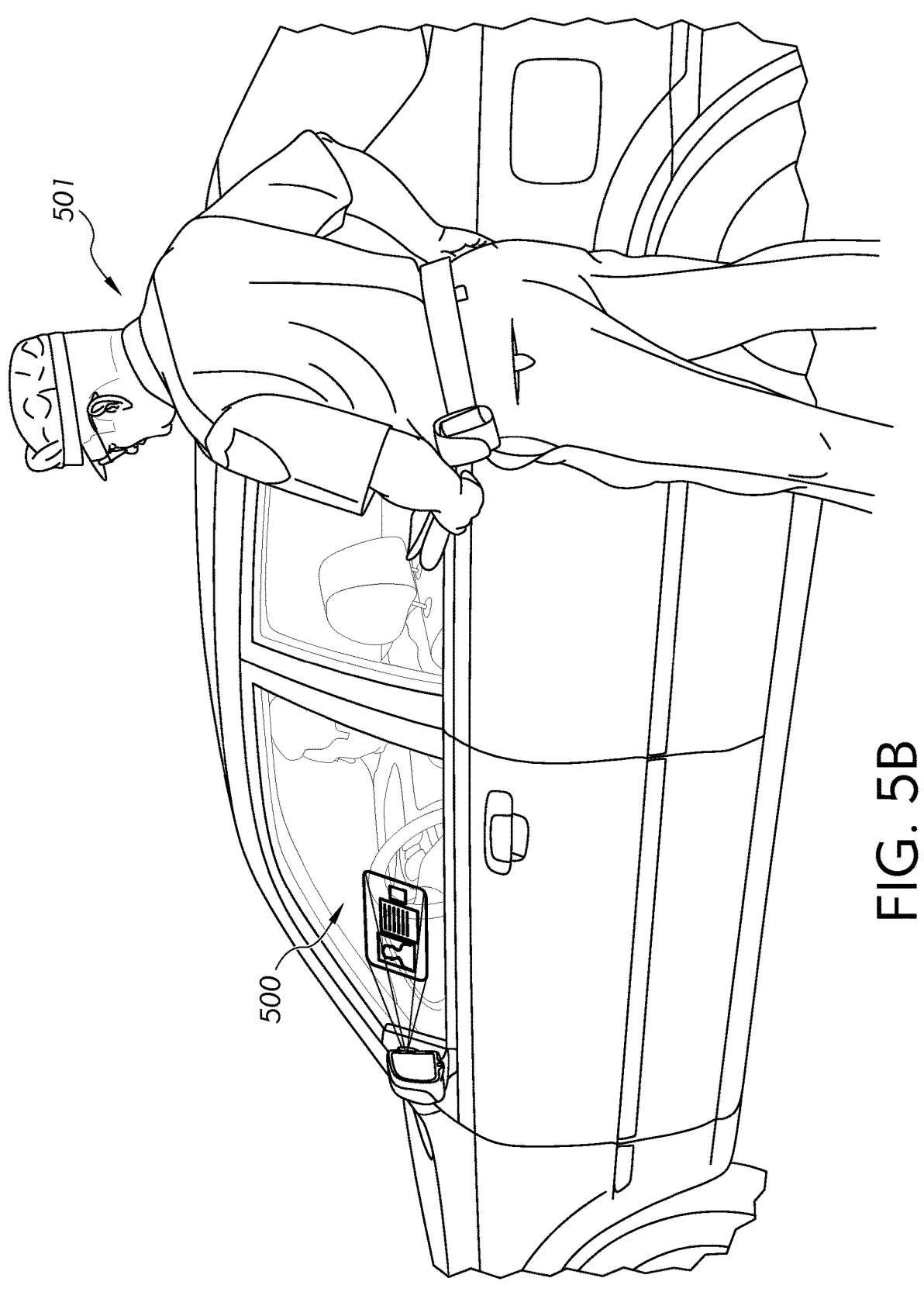
FIG. 5B is a left-side view of a vehicle with an individual occupying a driver's seat of the vehicle and another individual approaching the vehicle on the driver's side, wherein a holographic projector component positioned on the driver's side side-view mirror has been activated.

The following disclosure is provided to describe various embodiments of systems and methods for enhancing security of vehicle occupants utilizing holographic technology. Skilled artisans will appreciate additional embodiments and uses of the methods and systems that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more elements in that group, which may be included with other elements of the group. All numbers, measurements, and values are given as approximations unless expressly stated otherwise.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings.

Various aspects of the disclosure will now be described in detail, without limitation. Those of skill in the art will appreciate that alternative labeling of the methods and systems may be provided, which is consistent with the scope and spirit of this disclosure. Skilled readers should not view the inclusion of any alternative labels as limiting in any way.

For the purpose of clearly describing the components and features discussed throughout this disclosure, some frequently used terms will now be defined, without limitation. As used herein, the term "object" shall mean a human being, an animal, and/or an inanimate item.

The present disclosure concerns systems and methods for enhancing security of vehicle occupants utilizing holographic technology. Systems of the present disclosure may comprise, without limitation, a holographic projector component, a data repository component, a sensor component, a digital camera component, a data analyzing component, a control component, and a display screen component.

In an embodiment, systems of the present disclosure may comprise a holographic projector component; a data repository component communicatively and operatively connected with the holographic projector component; a sensor component; a digital camera component; and a display screen component communicatively connected with the digital camera component.

In another embodiment, systems of the present disclosure may comprise a holographic projector component; a data repository component communicatively and operatively connected with the holographic projector component; a sensor component; a data analyzing component communicatively and operatively connected with the sensor component; a control component communicatively and operatively connected with the data analyzing component; a digital camera component communicatively and operatively connected with the control component; and a display screen component communicatively and operatively connected with the digital camera component.

Holographic components will now be discussed in greater detail. Systems of the present disclosure may comprise one or more holographic projector components. 100, 301 The holographic projector component may be used to project a hologram of a driver's license, vehicle registration, information regarding ownership of an autonomous vehicle, auto insurance information, driver and passenger information utilized in connection with Uber, Lyft, and other ride-hailing and ride-sharing companies and applications, and/or other virtually any other type of documentation onto a surface 101, 500 from which such information may be perceived. The holographic projector component may, alternatively, project images into the air. A surface for receiving the images is not required in order to realize the benefits of systems of the present disclosure.

The holographic projector component may be positioned virtually anywhere on the interior or exterior of a vehicle. In one embodiment, a holographic projector component of the present disclosure may be positioned on a left side-view mirror of a vehicle 100, 301. According to such embodiment, the holographic projector component may project an image onto a window located on a left-hand side of a driver 101, 500.

In another embodiment, holographic projector components of the present disclosure may be mounted to a vehicle's interior. Such mounting may be achieved through use of adhesive. Such mounting may be achieved by screwing the holographic projector component to a vehicle's interior. Such mounting may be accomplished through any method that results in a holographic projector being firmly secured to an interior of a vehicle, which methods would be readily appreciated by those of skill in the art.

In an embodiment, the holographic projector component may be positioned within an interior of a vehicle so that holograms projected therefrom project onto a window located on a left-hand side of a driver 101, 500. In another embodiment, a holographic projector component may be positioned within an interior of a vehicle so that holograms projected therefrom project onto a window located on a right-hand side of a passenger positioned in a front, passenger-side, seat of a vehicle. In another embodiment, a holographic projector component may be positioned within an interior of a vehicle so that holograms projected therefrom project onto a front window of the vehicle.

The holographic projector component may be responsive to voice commands. In one exemplary embodiment, a verbal command signal may be utilized to effectuate transmission of a hologram of a driver's license, vehicle registration, or other document from the holographic projector component onto a driver's side window 101, 500. In such embodiment, the hologram may be sized such that that the content thereof may be readily perceptible by an individual located outside of the vehicle facing the driver's side window such as, without limitation, a law enforcement officer executing a traffic stop 501.

As an alternative to a holographic projector component, systems of the present disclosure may comprise a digital projector component. Such digital projector component will function substantially identically as a holographic projector component when utilized in connection with systems and methods of the present disclosure.

Data repository components of the present disclosure will now be discussed in greater detail. Data repository components of the present disclosure may comprise one or more remote data repositories. Alternatively, or in addition to such remote data repositories, data repository components as described herein may reside locally within the holographic projector component, within the digital camera component, within the digitally-enhanced rearview mirror component 200, within the digitally-enhanced sideview mirror component(s) 300, and/or within the digitally enhanced sun visor component 400.

Information and data generated in connection with, or otherwise related to, operation of systems and methods of the present disclosure (for example, an image of a driver's license, vehicle registration information, digital camera footage, distance between a vehicle and an individual approaching the vehicle, etc.), may be stored on a remote server. Such information and data may be accessed and/or downloaded from the remote server by a user of systems of the present disclosure.

Information and data generated in connection with, or otherwise related to, operation of systems and methods of the present disclosure (for example, an image of a driver's license, vehicle registration information, digital camera footage, distance between a vehicle and an individual approaching the vehicle, etc.), may be stored on any number of devices that may be appended to a vehicle or that may be built into a vehicle during manufacturing. Such information and data may be accessed and/or downloaded from these data storage devices by a user of systems of the present disclosure.

The holographic projector component may be communicatively and operatively connected with the data repository component. The holographic projector component may receive data transmitted to it from the data repository component.

Upon receipt of data, the holographic projector component may store the data locally for subsequent projection on receipt of a command signal to do so. Alternatively, the holographic projector component may receive and project data substantially in real-time. Without limitation, mode of projection (i.e., on-demand or real-time) may be governed by a corresponding setting that may be manipulable by a user.

Consistent with above, users of systems of the present disclosure may upload content to a dedicated web application and/or mobile application for transmission to a holographic projector component of the present disclosure. The web application or mobile application may be configurable to transmit a command signal to the holographic projector component to store such data or, alternatively, to project such data in substantially real-time. Users of the web application or the mobile application may enter an instruction into the application thereby effectuating transmission of such command signal. Such instruction may be entered manually (e.g., through capacitive touch screens) or may be entered verbally.

Sensor components will now be discussed in greater detail. Systems of the present disclosure may comprise a sensor component. The sensor component may comprise one or more sensors. Such sensors may comprise, without limitation, infrared sensors such as, for example and without limitation, passive infrared sensors. The sensor component may comprise proximity sensors such as, without limitation, capacitive proximity sensors and/or ultrasonic proximity sensors. Sensors of sensor components of the present disclosure may be locatable anywhere on the interior of the vehicle and/or on the exterior of the vehicle.

Sensor components of the present disclosure may be communicatively and operatively connected with digital camera components and/or with data analyzing components of the present disclosure.

Digital camera components of the present disclosure will now be discussed in greater detail. A digital camera component as contemplated herein may comprise one or more digital cameras. While the term "digital camera" is used throughout this disclosure, those of skill in the art will recognize that other cameras that function in a manner similar to digital cameras may be utilized in connection with systems and methods of the present disclosure if such other camera exhibits the functionality of a conventional video camera and also has the capacity to receive and transmit data and images.

Digital cameras of digital camera components as contemplated herein may be locatable virtually anywhere on the interior and/or the exterior of a vehicle. Such cameras may be positioned so that, collectively, they allow for 360 degree viewing capacity in all directions from the vehicle. Such digital cameras may be locatable within the interior of a vehicle thereby providing for a surveillance function. Based on privacy or other considerations, a user may activate or deactivate such internal cameras through a settings menu accessible through a web or mobile application, or through a display screen of a display screen component as contemplated herein.

By way of example and without limitation, digital cameras as contemplated herein may be embedded within a digitally-enhanced rear view mirror component 201, within a digitally-enhanced side-view mirror component 302, and/or within a digitally-enhanced sun visor component 401.

Digital camera components of the present disclosure may be configurable to automatically begin recording upon receiving a command signal from a control component. Such command signal may be triggered by a signal transmitted from a data analyzing component to the control component. The signal from the data analyzing component may be triggered once the distance between an individual and a vehicle has decreased below a pre-selected threshold value. Data regarding such distance may be transmitted to the data analyzing component from the sensor component upon detection by the sensor component of an individual approaching the vehicle.

Content automatically recorded according to the process described above may be stored locally within the digital camera component and/or may be stored remotely.

The digital camera component may be configurable to begin recording substantially on-demand through transmission of a command signal received by the digital camera component. Such transmission of command signals for effectuating such substantially on-demand recording may be initiated through a web application, through a mobile application using a capacitive touch screen, through a voice command, and/or through actuation of a control member locatable within the vehicle.

Systems of the present disclosure may further comprise a feature that, to one unfamiliar with the system, appears to deactivate the digital camera component, but without in fact deactivating the digital camera component. This feature may have the effect of causing an intruder to believe that the digital camera component has been deactivated when it has not.

Digital camera components as contemplated herein may be configurable to transmit content perceived thereby to a display screen component in substantially real-time or substantially on-demand.

Content captured by the digital camera component may be stored locally within the digital camera component and/or remotely.

Display screen components of the present disclosure will now be discussed in greater detail. Systems of the present disclosure may comprise a display screen component. Display screen components as contemplated herein may comprise one or more display screens.

Display screens of the display screen component may be locatable in any number of positions within the interior of a vehicle. Display screens of the display screen component may be positioned so that a driver, a passenger, and/or other vehicle occupant may readily perceive content displayed on the display screen(s). Without limitation, display screens of the display screen component may be locatable within a digitally-enhanced rearview mirror component 202, a digitally-enhanced side-view mirror component 303, a digitally-enhanced sun visor component 402, and/or any location within a vehicle's interior where a pre-existing screen may be located such as, for example, a pre-existing screen associated with a vehicle's radio. Display screens of the display screen component may be locatable virtually, such that they may be accessible through a mobile or web application.

Display screens of the display screen component may comprise multiple viewing modes. In one such viewing mode, such display screens may simultaneously display content transmitted to them by multiple cameras. The display screen component may be configurable with respect to which camera's or cameras' feed(s) are being displayed on the display screen(s). Such configurability may be effectuated through voice commands or manually through a mobile application, a web application, or control members locatable within a vehicle.

In another viewing mode, display screens of the display screen component may display content transmitted to them by a single camera. When operating in this viewing mode, the display screen component may be configurable such that a user may change which camera's content is displayed on a particular display screen. Such command signal may be executed through voice commands or manually through a mobile application, a web application, or control members locatable within a vehicle.

The display screen component may be communicatively and operatively connected with the digital camera component. Display screens of the display screen component may display data transmitted to them, such as images transmitted to them from the digital camera component, in substantially real-time. Alternatively, display screens of the display screen component may display data transmitted to them, such as images transmitted to them from the digital camera component, substantially on demand.

Display screens of display screen components of the present disclosure may be communicatively and operatively connected with the data repository component described above. According to such an embodiment, display screens of the display screen component may display data and images transmitted to the display screen component from the data repository component. According to another embodiment, the display screen component may be communicatively and operatively connected with the control component. According to such embodiment, the control component may be communicatively and operatively connected with the data repository component. According to such an embodiment, display screens of the display screen component may display data and images in accordance with command signals transmitted to the display screen component from the control component. Such command signals may be initiated by a user via voice command and/or via manipulation of a control member communicatively and operatively connected with the control component. Such control member may be locatable within a vehicle comprising systems of the present disclosure. Such control member may be locatable within a mobile or web application and may be manipulable capacitively.

Electromagnetic wave emitters may be communicatively and operatively connected with the control component. Longitudinal wave emitters may be communicatively and operatively connected with the control component.

Upon sensing an object approaching a vehicle 501, the sensor component may transmit data to a data analyzing component so as to allow the data analyzing component to calculate the distance between the object and the vehicle, and the rate at which the object is approaching the vehicle. Once the distance between the object and the vehicle decreases below a pre-selected threshold value, the data analyzing component may transmit a signal to a control component to activate electromagnetic wave emitters and/or longitudinal wave emitters. Upon receipt of said signal, the control component may transmit a command signal to one or more electromagnetic wave emitters and/or longitudinal wave emitters to emit electromagnetic waves and/or longitudinal waves, respectively.

Such electromagnetic waves may be emitted intermittently. The duration of periods between intermittent emission of electromagnetic waves may decrease as distance between the object and the vehicle decreases. Electromagnetic waves so emitted may comprise any number of colors such as, without limitation, white, yellow, red, or blue. Electromagnetic waive emitters as contemplated herein may be locatable anywhere within a vehicle. Positioning of such electromagnetic wave emitters may be such so as to enhance their effectiveness in alerting a driver to potential threats such as, without limitation, an object approaching the vehicle. Without limitation, such electromagnetic wave emitters may be locatable within a digitally-enhanced rearview mirror component, within a digitally-enhanced sideview mirror component, within a digitally-enhanced sun visor component 403, within a steering wheel, on a dashboard, or virtually anywhere else within a vehicle's interior. Such electromagnetic wave emitters may be locatable on a vehicle's exterior as well. Such positioning may serve a deterrence function insofar as an individual approaching a vehicle may be deterred from continuing to approach the vehicle if he or she observes, for example, bright flashing color lights being emitted from the vehicle where the frequency of the flashes increases as the individual gets closer to the vehicle.

In an embodiment, at least one electromagnetic wave emitter is located within at least one of the following: the digitally-enhanced rearview mirror component, the digitally-enhanced sideview mirror component(s), and the digitally-enhanced sun visor component.

The longitudinal waves may be emitted intermittently. The duration of periods between intermittent emission of longitudinal waves may decrease as distance between the object and the vehicle decreases. Longitudinal waves so emitted may vary in volume and/or pitch. Longitudinal waive emitters as contemplated herein may be locatable anywhere within a vehicle. Positioning of such longitudinal wave emitters may be such so as to enhance their effectiveness in alerting a vehicle occupant to potential threats such as, without limitation, an object approaching the vehicle. Without limitation, such longitudinal wave emitters may be locatable within a digitally-enhanced rearview mirror component, within a digitally-enhanced sideview mirror component, within a digitally-enhanced sun visor component, within a steering wheel, on a dashboard, or virtually anywhere else within a vehicle's interior. Such longitudinal wave emitters may be locatable on a vehicle's exterior as well. Such positioning may serve a deterrence function insofar as an individual approaching a vehicle may be deterred from continuing to approach a vehicle if he or she observes, for example, loud and/or high-pitched auditory signals being emitted from the vehicle where the volume and/or pitch increases as the individual gets closer to the vehicle.

Detection of objects as contemplated herein may also mitigate risk of a driver of a vehicle accidentally contacting said object.

Systems of the present disclosure may comprise a digitally-enhanced rearview mirror component 200, one or more digitally-enhanced sideview mirror components 300, and/or one or more digitally-enhanced sun visor components 400, installable in a vehicle.

The digitally-enhanced rearview mirror component may comprise a digital camera 201, said digital camera constituting a member(s) of, or the entirety of, the digital camera component.

The digitally-enhanced side-view mirror component(s) may comprise a digital camera 302, said digital camera constituting a member(s) of, or the entirety of, the digital camera component.

The digitally-enhanced sun visor component(s) may comprise a digital camera 401, said digital camera constituting a member(s) of, or the entirety of, the digital camera component.

The digitally-enhanced rearview mirror component may comprise a display screen 202, said display screen constituting one aspect of, or the entirety of, the display screen component.

The digitally-enhanced sideview mirror component may comprise a display screen 303, said display screen constituting one aspect of, or the entirety of, the display screen component.

The digitally-enhanced sun visor component may comprise a display screen 402, said display screen constituting one aspect of, or the entirety of, the display screen component.

The digitally-enhanced rearview mirror component may comprise a sensor, said sensor constituting one aspect of, or the entirety of, the sensor component.

The digitally-enhanced sideview mirror component may comprise a sensor, said sensor constituting once aspect of, or the entirety of, the sensor component.

The digitally-enhanced sun visor component may comprise a sensor, said sensor constituting once aspect of, or the entirety of, the sensor component.

Digitally-enhanced rearview mirror components 200 enabled by the present disclosure may be adjustable in position in substantially the same way that conventional rearview mirror components may be adjustable in position. Digitally-enhanced sideview mirror components 300 enabled by the present disclosure may be adjustable in position in substantially the same way that conventional sideview mirror components may be adjustable in position. Digitally-enhanced sun visor components 400 enabled by the present disclosure may be adjustable in position in substantially the same way that conventional sun visors may be adjustable in position.

The digitally-enhanced rearview mirror component, sideview mirror component(s), and/or sun visor component(s) may be communicatively and operatively connected with the data repository component.

The digitally-enhanced rearview mirror component, sideview mirror component(s), and/or sun visor component(s) may be configurable to receive data transmitted to them by the data repository.

The digitally-enhanced rearview mirror component, sideview mirror component(s), and/or sun visor component(s) may be configurable to display such data onto display screens of the display screen component upon receipt of such data. Such display of data may occur substantially in real-time or, alternatively, may occur substantially on demand. Through a settings menu, a user may adjust whether such display of data occurs substantially in real time or substantially on demand. Such settings menu may be accessible through a web or mobile application or through a display screen of the display screen component.

Those of skill in the art will readily appreciate that auxiliary system components may be utilized in connection with systems of the present disclosure that may further enhance security of vehicle occupants and/or further mitigate risk of undesired intrusion into a vehicle by an assailant. Without limitation, one such auxiliary component may comprise an aperture member extending between the interior and exterior of a vehicle. Such aperture member may be locatable at a position so as to facilitate passing through of documents, such as, without limitation, a driver's license or vehicle registration, from the interior of the vehicle to the exterior of the vehicle.

Such an aperture member may decrease the number of instances in which vehicle occupants are in direct physical contact with, or in close proximity with (i.e., twelve inches or less), an object positioned immediately outside of the vehicle. For example, where a law enforcement officer makes a traffic stop and asks a driver of a vehicle for his or her driver's license and vehicle registration, the driver may provide the officer with this documentation through the aperture member. By substantially maintaining a physical barrier between the officer and the vehicle occupant(s), such individuals' sense of physical security and well-being may be enhanced. This may mitigate risk of misinterpretation of physical activity and decrease the degree of physical threat perceived by such individuals during the traffic stop.

Settings related to components of systems of this disclosure such as, without limitation, display screen brightness, how close an object must be to the vehicle in order to activate automatic recording by the digital camera component, brightness of the electromagnetic wave emitters, and volume of the longitudinal wave emitters, may be controlled, by way of example only and without limitation, through a control unit located within the vehicle, and/or remotely through a mobile or web application communicatively connected with the components of systems of the present disclosure.

One setting may include an option to utilize voice commands to activate, deactivate, and/or otherwise manipulate specific components of the system.

Once executed, such voice commands may be overridden through manual commands. Such manual commands may be executed through a web application or a mobile application, including, without limitation capacitively through the display screen component. Such manual commands may be executed using control members within the vehicle.

Another setting may allow for auto-recording upon detection of motion outside of a vehicle, as discussed herein. In one embodiment, where an object approaches a vehicle, the sensor component may detect said object and transmit a signal to a data analyzing component. The data analyzing component may then calculate distance between the object and the vehicle and may display this data onto the display screen component. Once that distance decreases below a pre-selected threshold value, the data analyzing component may transmit a signal to a control unit. Upon receipt of said signal, the control unit may transmit a command signal to the digital camera component to begin recording. The digital camera component may then transmit data perceived thereby to the display screen component for display in substantially real time. Where more than one object is approaching the vehicle concurrently, the display screen component may display footage from multiple digital cameras simultaneously so that a vehicle occupant may be able to track multiple threats at the same time.

Components of systems of the present disclosure may be activated, deactivated, or otherwise manipulable through voice command.

Components of systems of the present disclosure may be activated, deactivated, or otherwise manipulable through control members located within a vehicle.

Components of systems of the present disclosure may be activated, deactivated, or otherwise manipulable through control members manipulable through a web or mobile application communicatively connected with the control component. According to such an embodiment, the control component may, upon receipt of a command signal from the web or mobile application, transmit a corresponding control signal to the pertinent system component.

Components of systems of the present disclosure may be activated, deactivated, or otherwise manipulable automatically pursuant to pre-programed control criteria. In one embodiment, the control component may be pre-programmed to activate recording by the digital camera component once the distance between a vehicle and an object approaching the vehicle decreases below a pre-selected threshold level. In another embodiment, emitting of electromagnetic waves and/or longitudinal waves from the electromagnetic wave emitters and/or the longitudinal wave emitters respectively may occur automatically once the distance between a vehicle and an object approaching the vehicle decreases below a pre-selected threshold level.

Systems of the present disclosure may further be communicatively connected with like systems in other vehicles. According to one such embodiment, a digital camera component of a first system enabled by the present disclosure included within a first vehicle may be communicatively connected with a digital camera component of a second system enabled by this disclosure included within a second vehicle. Said connection may be such so as to allow for videoconferencing between occupants of said first vehicle and said second vehicle.

Consistent with current videoconferencing capability, data other than video may also be transmitted between said videoconferencing participants. In one exemplary embodiment, a law enforcement officer located within a first vehicle comprising a first system of the present disclosure may transmit a digital traffic citation to an occupant of a second vehicle comprising a second system of the present disclosure. In another embodiment, an occupant located within a first vehicle comprising a first system of the present disclosure may transmit a digital message comprising text to an occupant of a second vehicle comprising a second system of the present disclosure. In another embodiment, an occupant located within a first vehicle comprising a first system of the present disclosure may transmit a video to an occupant of a second vehicle comprising a second system of the present disclosure.

According to an embodiment, an occupant of a first vehicle comprising a first system of the present disclosure may initiate transmission of a request to a second system of the present disclosure included within a second vehicle to establish a line of communication between said first and second vehicles. Upon receipt of said request, an occupant of said second vehicle may have an option of accepting or declining the request. If the occupant of the second vehicle accepts the request, the first system of the first vehicle will be able to effectively communicate with the second system of the second vehicle as contemplated herein. If the occupant of the second vehicle rejects the request, the first system of the first vehicle will not be able to communicate with the second system of the second vehicle as contemplated herein.

According to an embodiment, such inter-vehicle communication may be able to be activated only when both vehicles' transmissions are in park.

Systems of the present disclosure may be utilized in connection with methods for enhancing physical security of occupants of a vehicle. Systems of the present disclosure may be utilized in connection with methods for mitigating risk of physical altercations between vehicle occupants and one or more objects that may be approaching a vehicle.

While various aspects have been described in the above disclosure, the description of this disclosure is intended to illustrate and not limit the scope of the invention. The invention is defined by the scope of the claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims.

What is claimed is:

1. A method for enhancing physical security of a vehicle occupant and a person approaching the vehicle comprising:
    providing a holographic or digital projector component positioned within the vehicle;
    providing a remote data repository component communicatively and operatively connected with the holographic or digital projector component;
    providing a sensor component;
    providing a digital camera component; and
    providing a display screen component communicatively connected with the digital camera component;
    wherein upon initiation of a command signal by the vehicle occupant, data is transmitted from the data repository component to the holographic or digital projector component;
    wherein, upon receipt of the data, the holographic or digital projector component projects the data into the external environment in a manner such that the data is perceptible to the person approaching the vehicle;
    providing a data analyzing component communicatively and operatively connected with the sensor component; and
    providing a control component communicatively and operatively connected with the data analyzing component and with the digital camera component;
    wherein, upon the data analyzing component determining that distance between the person approaching the vehicle and the vehicle has decreased below a threshold level, the data analyzing component transmits a command signal to the control component, whereupon the control component transmits a command signal to the digital camera component to begin recording, and wherein the content so recorded is transmitted to the display screen component and is also stored in the remote data repository component.

2. The method of claim 1, further comprising providing at least one longitudinal and/or electromagnetic wave emitter communicatively and operatively connected with the control component, wherein the control component transmits a command signal activating the at least one longitudinal and/or electromagnetic wave emitter when distance between the person approaching the vehicle and the vehicle has decreased below a threshold level.

3. The method of claim 2, wherein the at least one longitudinal and/or electromagnetic wave emitter is located within at least one of the following:
    a rearview mirror of the vehicle, a sideview mirror of the vehicle, and a sun visor of the vehicle.

4. The method of claim 3, wherein the holographic or digital projector component is located within the rearview mirror, the side-view mirror, or the sun visor.

5. The method of claim 4, wherein the digital camera component comprises digital cameras located on the interior and exterior of the vehicle.

6. A method for enhancing physical security of a vehicle occupant and a person approaching the vehicle comprising:
    providing a holographic or digital projector component positioned within the vehicle;
    providing a remote data repository component communicatively and operatively connected with the holographic or digital projector component;
    providing a sensor component;
    providing a data analyzing component communicatively and operatively connected with the sensor component;
    providing a control component communicatively and operatively connected with the data analyzing component;

providing a digital camera component communicatively and operatively connected with the control component; and providing a display screen component communicatively and operatively connected with the digital camera component;

wherein, upon the data analyzing component determining based on data received from the sensor component that distance between the person approaching the vehicle and the vehicle has decreased below a threshold level, such data is transmitted to the control component and a command signal is transmitted from the control component to the digital camera component for the digital camera component to begin recording, wherein the content so recorded is transmitted to a display screen component and is also stored in the remote data repository;

providing an aperture in the vehicle extending from the interior to the exterior of the vehicle;

wherein the aperture is sized and configured so as to allow the vehicle occupant to transmit documents to the person approaching the vehicle through the aperture without coming into direct physical contact or close proximity with the person approaching the vehicle;

wherein upon entry of a command signal by the vehicle occupant, data is transmitted from the data repository component to the holographic or digital projector component; and wherein, the holographic or digital projector component, upon receipt of the data, projects the data onto a surface of the vehicle perceptible to the person approaching the vehicle.

7. The method of claim 6, wherein the data repository component is located on a remote server.

8. The method of claim 6, wherein:

the data repository resides within a web application or a mobile application; and wherein the vehicle occupant enters an instruction into the web application or mobile application effectuating transmission of data from the data repository to the holographic or digital projector component and transmission of a command signal from the web application or mobile application to the holographic or digital projector component to display the data in real-time.

9. The method of claim 7, further comprising providing at least one longitudinal and/or electromagnetic wave emitter communicatively and operatively connected with the control component, wherein the at least one longitudinal and/or electromagnetic wave emitter is activated on-demand by transmission of a command signal from the control component to the at least one longitudinal and/or electromagnetic wave emitter, wherein the command signal is initiated through a web application or mobile application.

10. The method of claim 9, wherein the at least one longitudinal and/or electromagnetic wave emitter is located within at least one of the following: the rearview mirror of the vehicle, a sideview mirror of the vehicle, and a sun visor of the vehicle.

11. The method of claim 10, wherein the holographic or digital projector component is located within the rearview mirror, a side-view mirror, or a sun visor of the vehicle.

12. The method of claim 11, wherein the digital camera component comprises digital cameras located on the interior and exterior of the vehicle.

13. The method of claim 6, wherein the digital camera component further comprises one or more digital cameras positioned within the vehicle's interior and wherein said one or more digital cameras may be manually activated and de-activated through a settings menu located within a web or mobile application.

14. The method of claim 6, further comprising providing a decoy digital camera deactivation component accessible from the vehicle's interior that is inoperable to deactivate the digital camera component.

15. The method of claim 12, wherein the rearview mirror, a side-view mirror, and/or a sun visor of the vehicle comprise at least one digital camera.

16. The method of claim 12, wherein each of the one or more display screens of the display screen component simultaneously display content to transmitted to them by multiple digital cameras.

17. The method of claim 16, wherein once the distance between the person approaching the vehicle and the vehicle has decreased below the threshold level, the data analyzing component transmits a command signal to a control component to activate electromagnetic wave emitters and/or longitudinal wave emitters; and wherein, upon receipt of the command signal, the control component transmits a command signal to one or more electromagnetic wave emitters and/or longitudinal wave emitters to emit electromagnetic waves and/or longitudinal waves, respectively.

18. The method of claim 17, wherein emission of electromagnetic waves and/or longitudinal waves is periodic and wherein the periods decrease in proportion to the distance between the person approaching the vehicle and the vehicle.

19. The method of claim 18, further providing for configuring the control component to automatically begin recording according to a pre-determined schedule.

* * * * *